United States Patent [19]
Horn et al.

[11] Patent Number: 5,395,142
[45] Date of Patent: Mar. 7, 1995

[54] WELDING JOINT AND BACKING SLEEVE THEREFORE

[75] Inventors: Joachim Horn, Willich, Germany; Jan Slings, Noord-Scharwoude, Netherlands

[73] Assignees: HMC H. Meyer & Co. Spezialstahl GmbH, Dusseldorf, Germany; Hoogovens Groep BV, Ijmuiden, Netherlands

[21] Appl. No.: 57,768

[22] Filed: May 7, 1993

[30] Foreign Application Priority Data

May 7, 1992 [DE] Germany .................. 4214492.2
Jun. 9, 1992 [NL] Netherlands ................. 9201006

[51] Int. Cl.$^6$ .................. B23K 9/02; F16L 13/02
[52] U.S. Cl. ................... 285/286; 228/50
[58] Field of Search ................ 285/286; 228/50

[56] References Cited

U.S. PATENT DOCUMENTS

| | | |
|---|---|---|
| 2,188,925 | 2/1940 | Ronay . |
| 2,362,505 | 11/1944 | Smith .................. 228/50 |
| 2,796,843 | 6/1957 | Kleppinger . |
| 2,820,427 | 1/1958 | Chylte et al. ........... 228/50 |
| 2,847,958 | 8/1958 | Norton, Jr. et al. . |
| 3,432,915 | 3/1969 | Doyle ................... 228/50 |
| 3,460,736 | 8/1969 | Cadle et al. ............ 228/50 |
| 3,972,466 | 8/1976 | Keith .................. 228/50 |
| 4,182,951 | 1/1980 | Kuder .................. 228/50 |
| 4,285,458 | 8/1981 | Slavens . |
| 4,295,593 | 10/1981 | Kensrue ................ 228/50 |
| 4,360,141 | 11/1982 | Kensrue ................ 228/50 |
| 5,110,031 | 5/1982 | Rinaldi . |

FOREIGN PATENT DOCUMENTS

| | | | |
|---|---|---|---|
| 510578 | 3/1955 | Canada ................ 228/50 |
| 2542234 | 9/1984 | France ................. 228/50 |
| 616151 | 6/1935 | Germany ............... 228/50 |
| 8701121.2 | 6/1987 | Germany . |
| 48-30220 | 9/1973 | Japan .................. 228/50 |
| 77199 | 4/1987 | Japan .................. 228/50 |
| 31599 | 2/1989 | Japan .................. 228/50 |
| 9002397 | 6/1992 | Netherlands . |
| 9101779 | 6/1992 | Netherlands . |

OTHER PUBLICATIONS

Patent Abstracts of Japan, vol. 10, No. 171 (M-489) [2227] Jun. 17, 1986, Kazuo Taguchi.

*Primary Examiner*—Eric K. Nicholson
*Attorney, Agent, or Firm*—Stevens, Davis. Miller & Mosher

[57] ABSTRACT

Welding joint (18,22) connecting workpieces (19,20,24,29) having a throughlet (25) comprising a weld (21,34) wherein a backing sleeve (10,28) is held within the workpieces (19,20,24,29) in the region of the weld. The welding joint comprises a partition layer (15,33) of a non-weldable material between the workpieces (19,20,24,29), the weld (21,34) and the backing sleeve (10,28), resulting in a welding joint easy to establish and of improved strength and fatigue resistance.

20 Claims, 2 Drawing Sheets

WELDING JOINT AND BACKING SLEEVE THEREFORE

BACKGROUND OF THE INVENTION

FIELD OF THE INVENTION

The invention relates to a welding joint by means of which workpieces having a throughlet, such as pipes, bends, junction parts and the like are joined together, in which on the inner side of the workpieces in the region of the weld a backing sleeve is present. The invention also relates to a backing sleeve for use in the joint as a permanent remaining part enclosed in said joint.

DESCRIPTION OF THE PRIOR ART

Such a welding joint and a backing sleeve suitable for use therein is known from DE-U-8701121.2. In order to establish the known welding joint, the pipe-ends to be welded together are widened up into conical shape. The pipe-ends are put over both ends of a backing sleeve, which externally has the shape of two truncated cones with their bases laid together. The backing sleeve has an internal diameter which corresponds to that of the pipes to be welded together so that the flow in the pipe is not obstructed by the presence of the backing sleeve.

Use of such a backing sleeve is advantageous for simplifying the welding process, since the pipe-ends are held in a defined position and the weld is prevented from sagging into the piping. However, this known solution has several drawbacks. When the backing sleeve is of ordinary steel there is a risk of oxidation on the inside of the backing sleeve. Especially in the case of welding joints in hydraulic piping it is necessary to remove such oxidation by means of pickling. Such pickling has to be done under great care and involves the subsequent processing of used pickling acids which is costly and subject to governmental environmental regulations. The necessity to pickle can be obviated by using backing sleeves of special steel, e.g. stainless steel, in which case however the welding is complicated in that special measures have to be taken in order to be able to weld the stainless steel. A further drawback is that the known joint has a fatigue strength which is unsatisfactory especially in the case of alternating loads occurring, as is the case in heavy industry hydraulics. It turns out that with the weld extending into the backing sleeve, cracks soon occur in the welded joint. Such cracks start from the boundary region where the weld, the backing sleeve and the pipe-ends come together. These cracks grow under the alternating load and inevitably lead to untimely rupture of the joint.

Other backing devices for welding of hollow cylindrical objects are known, which are removed after the welding, see JP-A-61-20676, U.S. Pat. No. 2,188,925, U.S. Pat. No. 2,847,958. These backing devices consist of e.g. ceramic or heat-resistant material, and partly comprise synthetic resins as a binding agent. Such backing devices are intended to provide for a smooth surface and/or to make additional treatment superfluous. The removal of such backing devices would cause considerable difficulties when longer pipes are to be joined. Especially in hydraulic systems where the demands of cleanliness are very strict such backing devices are not usable.

Also an apparatus is known that is movable in a pipe. It comprises a segmented ring with pads of ceramic or similar material of which the segments are radially movable so as to be positioned for backing of the weld, see GB-A-2249983. Here also the segmented ring only serves as a backing during welding and is removed thereafter. Such apparatus is complicated and is only suitable for piping of large inner diameter. For hydraulic piping systems in heavy industry and similar applications such apparatus is not usable.

SUMMARY OF THE INVENTION

The object of the invention is to provide a welding joint and a backing sleeve suitable for use therein, such that the welding joint can be made easily and has a better strength and especially high fatigue resistance. According to the invention the welding joint comprises a non-weldable partition layer between the inner wall of the workpieces and the weld on the one hand and the backing sleeve on the other. Surprisingly it was found that a relatively thin partition layer from a non-weldable material, for example non-metallic, especially ceramic and/or heat-resisting material of a thickness of less then 1 mm, preferable even less then 0.5 mm, is sufficient to obviate welding or burning through of the weld into the backing sleeve. Since the backing sleeve forms no part of the weld the welding can take place with the normal welding accessories that are necessary for the welding together of the workpieces. Since the backing sleeve forms no part of the weld, initiation of cracks as occurs with the known welding joint cannot take place, resulting in a substantial increase in fatigue resistance for the welding joint according to the invention. Additionally, the partition layer acts as a heat insulation leading to a build-up of heat causing the weld to cool down more slowly which in turn yields a weld of better structure. Also the distribution of stresses in the piping material is homogeneous which further contributes to the high fatigue resistance.

The joint according to the invention is such that the backing sleeve is held within the joint in a fixed position. The workpieces can for example be widened into conical shape, in which case the backing sleeve has a complementary double cone shape. If desired, the workpieces and the backing sleeve may be of a cylindrical shape also.

The partition layer may be from a material suitable to be sprayed with known spraying methods. The backing sleeve is of a suitable material, e.g. steel. If there are strict demands on cleanliness it is preferable that the backing sleeve is of stainless steel so that oxidation will not at all take place. This may be also preferable to prevent the backing sleeve from oxidizing during storage and transport.

The partition layer should extend over the width of the weld, but it is not necessary that it extends to the ends of the backing sleeve. In a preferred embodiment the partition layer lies in a central zone of the sleeve which is slightly reduced in diameter, such that the partition layer does not extend over the imaginary extrapolation of the outer surfaces of the backing sleeve. This can be achieved through the provision of rims near the ends of the metallic part of the backing sleeve, or by providing the backing sleeve with an annular nut on which the partition layer is applied. These provisions make that any particles that should loosen are caught in between the piping and the backing sleeve and are thereby prevented from getting into the interior of the piping. In the embodiment with the annular nut carrying the partition layer it is preferable that the thickness of the partition layer is smaller towards the sides in order to increase the sealing effect, while also saving heat resistant material.

BRIEF INTRODUCTION OF THE DRAWINGS

Embodiments of the invention will now be described by way of non-limitative example with reference to the accompanying drawings in which.

Figure 1:
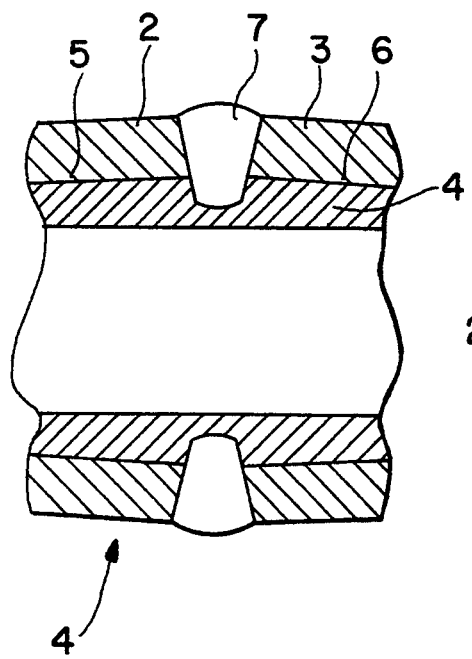
FIG. 1 is a partial sectional view of a known welding joint.

FIG. 1 shows welding joint 1 according to DE-U-8701121.2. The welding joint 1 comprises two widened pipe-ends 2,3 and a bridging backing sleeve 4 inserted in the pipe-ends.

The backing sleeve 4 has a constant inner diameter which corresponds to the inner diameter of the pipe-ends 2 and 3 outside their widened regions. The outer surfaces of the backing sleeve 4 correspond to the inner surfaces of the pipe-ends 2,3 and the backing sleeve 4 externally has the shape of two truncated cones with their bases laid together.

Pipe-ends 2,3 are welded together e.g. with a V-shaped weld as shown. As a consequence of the heat generation in the weld 7, inherently a welding through with backing sleeve 4 takes place. The weld 7 in FIG. 1 therefore extends into the backing sleeve 4 so that the welding joint connects the pipe-ends 2,3 to each other and to the backing sleeve 4.

Figure 2:
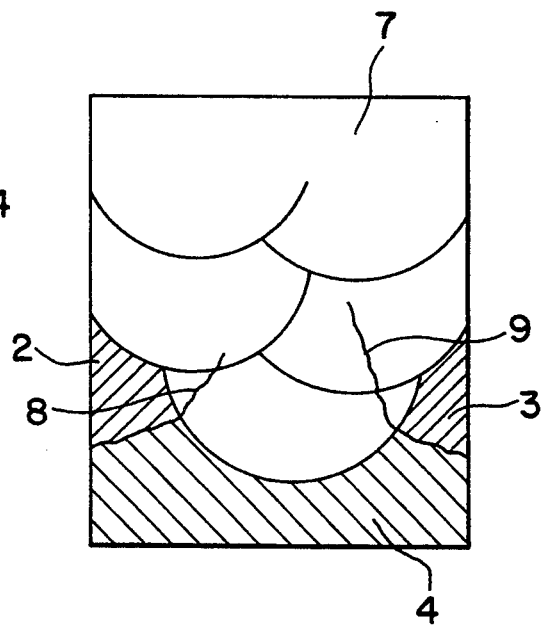
FIG. 2 is an enlargement of a detail of the welding joint of FIG. 1.

FIG. 2 shows an enlargement of this region where the pipe-ends 2,3 and the backing sleeve 4 are welled together. Under pressure and in the known welding joint typically cracks 8,9 occur which start and grow from the boundary zones between the pipe-ends 2,3, the backing sleeve 4 and the weld 7. Under further fatigue loading and subsequent associated crack growth the cracks will inevitably result in failure of the joint.

Figure 3:
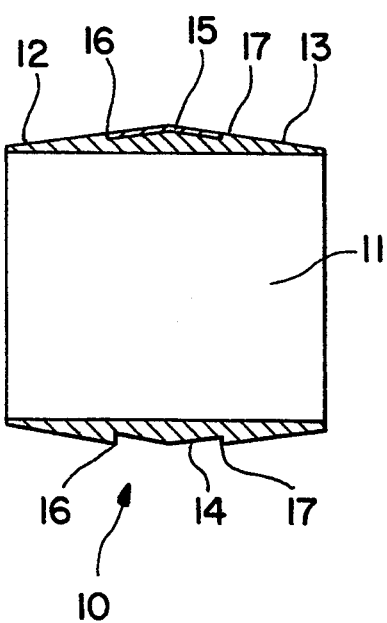
FIG. 3 is a sectional view of a backing sleeve according to the invention.
Figure 4:
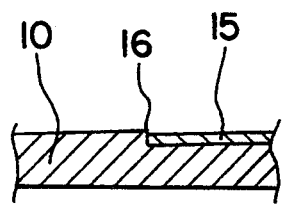
FIG. 4 is an enlargement of part of the backing sleeve according to FIG. 3.

FIG. 3 and 4 show a backing sleeve according to the invention. In its middle region it comprises an annular nut 14, the bottom of which extends parallel to the imaginary extrapolation of the conical surfaces 5,6. In the annular nut 14 partition layer 15 is applied. In order to show the shape of annular nut 14 more clearly the partition layer 15 is not shown in the lower half of FIG. 3. The partition layer 15 extends annularly over the periphery of the annular nut 14.

As is shown in the enlargement according to FIG. 4, the thickness of the partition layer 15 is smaller than the depth of the annular nut 14. The partition layer 15 thus does not extend over the imaginary extrapolation of the conical surfaces 12,13 of the backing sleeve 10. In this way the edges 16,17 border the annular nut 14.

Figure 5:
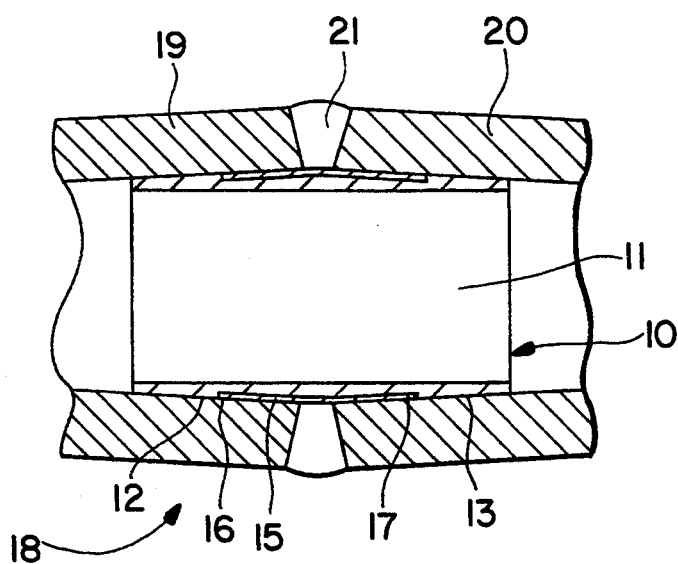
FIG. 5 is a sectional view of a welding joint with the backing sleeve of FIG. 3 according to the invention.

FIG. 5 shows the backing sleeve 10 held within the welding joint 18 according to the invention. The widened pipe-ends 19,20 face each other and hold the inserted backing sleeve 10 at its conical surfaces 12,13. The ends of the pipe-ends 19,20 are welded together through weld 21. The partition layer 15 of only 0.4 mm thickness has prevented the weld from welding through into the backing sleeve 10. There exists no welding joint of the backing sleeve 10 with the pipe-ends 19,20 nor with the weld 21. The backing sleeve 10 is held by its shape in the shown position. As a consequence of the cooling down after welding, the pipe-ends 19,20 are drawn together and the backing sleeve 10 is fixed, such that the space between the backing sleeve and the pipe-ends comprising the partition layer is sealed. In this way eventually loosened particles from said partition layer are prevented from getting into the interior of the piping system.

Figure 6:
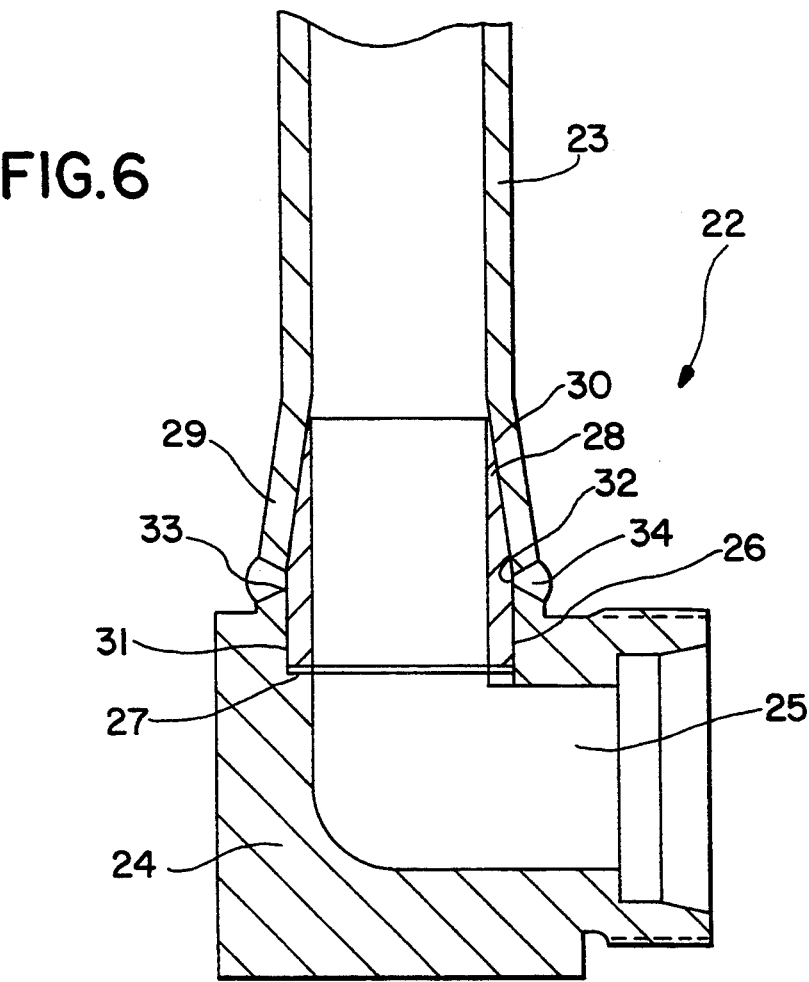
FIG. 6 is a sectional view of a welding joint according to the invention in another embodiment.

FIG. 6 shows a welding joint 21 in which a pipe-end 23 is connected to a junction part 24. The junction part 24 is for example a bend at a right angle. The junction part 24 may have a cylindrical bore 26 with a rim 27 in which backing sleeve 28 is inserted. The other end of the backing sleeve 28 is inserted into a widened pipe-end 29 of pipe 23. In this embodiment backing sleeve 28 has a conical surface 30 on one side and a cylindrical surface 31 on the other side.

In a middle region between the conical surface 30 and the cylindrical surface 31 the backing sleeve 28 has an annular nut 32, the bottom of which extends parallel to the imaginary extrapolation of the conical surface 30 and the cylindrical surface 31 respectively. In the annular nut 32 there is a partition layer 33 in the same way as shown in FIG. 3, 4 and 5. The partition layer does not extend over the imaginary extrapolations of the conical surface 30 and the cylindrical surface 31. The backing sleeve 10,28 may consist of stainless steel, so that the occurrence of oxidation is obviated in all cases. A backing sleeve provided with heat-resistant layer with a thickness of 0,2–0,4 mm of a sprayable ceramic material comprising more than 90% $Al_2O_3$, 0,5 to 5% $TiO_2$ and 0,5 to 5% $SiO_2$ constituting the partition layer has shown excellent results.

The ceramic material forms a heat barrier and does not fuse with the weld 21,34.

What is claimed is:

1. A welding joint in which workpieces (19,20,24,29) such as pipes, bends, and junction parts, having a throughlet (25) are welded together by means of a weld (21,34) and a backing sleeve (10,28) is positioned on the inside of the workpieces (19,20,24,29) in the region of the weld (21,34), at least one of said workpieces (19,20,24,29) widening into a conical shape towards the weld (21,34), the backing sleeve (10,28) having corresponding outer surfaces (12,13,30), said welding joint comprising a partition layer (15,33) from a non-weldable material which partition layer is located between the workpieces (19,20,24,29) and the backing sleeve (10,28) extending at least over the region of the weld (21,34), said backing sleeve (10,28) being permanently held in the welding joint ( 18,22 ) by its shape.

2. The welding joint as claimed in claim 1, wherein one workpiece (24) has a cylindrical bore (26) and a rim (27) for a backing sleeve (28), the backing sleeve (28) comprising a cylindrical outer surface (31).

3. The welding joint as claimed in claim 1, wherein both joined workpieces (19,20) are widened in conical shape towards the weld, the backing sleeve (10) having a corresponding outer surface ( 12,13 ).

4. The welding joint as claimed in claim 1, wherein the backing sleeve (10,28) has an inner diameter essentially corresponding to an inner diameter of the workpieces (19,20,24,29) longitudinally beyond the conical shape.

5. An annular backing sleeve (10,28) positionable on the inside of workpieces (19,20,24,29) in a region of a weld (21,34) to be made, said backing sleeve having a portion thereof conical in shape, narrowing away from the region of the weld (21,34) to be made, said backing sleeve comprising a partition layer (15,33) from a non-weldable material which partition layer is located on the outside of said backing sleeve (10,28) extending at least over the region of the weld (21,34) to be made, said backing sleeve (10,28) being permanently retainable in a welded joint (18,22) by its shape.

6. The backing sleeve (10,28) of claim 5, wherein the inner diameter of said backing sleeve essentially corresponds to an inner diameter of the workpieces (19,20,24,29) into which said backing sleeve is to be inserted longitudinally beyond the conical shape of said backing sleeve.

7. The backing sleeve as claimed in claim 5, wherein said partition layer (15,33) comprises a heat-resistant material.

8. The backing sleeve as claimed in claim 5, wherein said partition layer (15,33) is of a sprayable material.

9. The backing sleeve as claimed in claims 5, wherein said backing sleeve (10,28) is of a non-oxidizing metal.

10. The backing sleeve as claimed in claim 5 wherein said partition layer (15,34) extends over a middle range of the backing sleeve (10,28) only.

11. The backing sleeve as claimed in claim 5 wherein said partition layer (15,34) is an insert in the backing sleeve (10,28).

12. The backing sleeve as claimed in claim 5, wherein said backing sleeve (10,28) has ends comprising protrusions (16,17) located between the ends of the backing sleeve and the partition layer.

13. The backing sleeve as claimed in claim 12, defining protrusions (16,17) which are the edges of an annular nut (14,32) into which nut the partition layer (15,34) is inserted.

14. The backing sleeve as claimed in claim 5, wherein the backing sleeve comprises an annular rim.

15. The backing sleeve as claimed in claim 5, wherein said partition layer (15,33) has a thickness of less than 1 mm.

16. The backing sleeve as claimed in claim 13, wherein said partition layer (15,33) has a thickness less than a depth of said protrusions.

17. The backing sleeve as claimed in claim 5, wherein said backing sleeve (28) has a portion of its outer surface (31) cylindrical.

18. The backing sleeve as claimed in claim 5, wherein said backing sleeve (10) comprises two conical surfaces (12,13) with the smallest diameters at free ends.

19. The backing sleeve as claimed in claim 5, wherein said partition layer has an external surface complementary to surfaces against which the partition layer (15,33) is to be applied.

20. The backing sleeve as claimed in claim 5, wherein said partition layer does not extend an extrapolation of an outer surface of the backing sleeve.

* * * * *